(12) United States Patent
Sidagni

(10) Patent No.: US 8,756,698 B2
(45) Date of Patent: Jun. 17, 2014

(54) METHOD AND SYSTEM FOR MANAGING COMPUTER SYSTEM VULNERABILITIES

(75) Inventor: Michelangelo Sidagni, New York, NY (US)

(73) Assignee: NopSec Inc., New York, NY (US)

( * ) Notice: Subject to any disclaimer, the term of this patent is extended or adjusted under 35 U.S.C. 154(b) by 0 days.

(21) Appl. No.: 13/572,180

(22) Filed: Aug. 10, 2012

(65) Prior Publication Data

US 2014/0047546 A1 Feb. 13, 2014

(51) Int. Cl.
*G06F 21/00* (2013.01)

(52) U.S. Cl.
USPC ............... 726/25; 726/22; 726/23; 709/200; 709/223; 709/224

(58) Field of Classification Search
USPC .......................................................... 726/25
See application file for complete search history.

(56) References Cited

U.S. PATENT DOCUMENTS

| | | | |
|---|---|---|---|
| 6,883,101 B1 | 4/2005 | Fox et al. | |
| 7,861,299 B1 | 12/2010 | Tidwell et al. | |
| 8,621,073 B2 * | 12/2013 | McClure et al. | 709/224 |
| 2002/0087882 A1 * | 7/2002 | Schneier et al. | 713/201 |
| 2008/0040802 A1 * | 2/2008 | Pierson et al. | 726/22 |
| 2010/0333002 A1 * | 12/2010 | Karabey et al. | 715/764 |
| 2012/0216190 A1 * | 8/2012 | Sivak | 718/1 |
| 2012/0317491 A1 | 12/2012 | Wong et al. | |

OTHER PUBLICATIONS

"Using model checking to analyze network vulnerabilities"; Ritchey et al; Proceedings of the 2000 IEEE Symposium on Security and Privacy; 10 Pages; IEEE Computer Society Washington, DC, USA 2000.*

* cited by examiner

*Primary Examiner* — Jason Lee
(74) *Attorney, Agent, or Firm* — Chadbourne & Parke LLP

(57) ABSTRACT

A vulnerability risk management (VRM) module receives an indication of a VRM service to be provided from the end user. The VRM module extracts from the indication either external IP addresses or the web application URL and a list of assets of the enterprise computer system to be tested. The VRM module discovers the assets of the enterprise computer system. The VRM module receives a request for a vulnerability scan using a predefined scan configuration based on preferences of the end user and a specified date and time to conduct the scan. The VRM module reports and stores a preliminary list of potential vulnerabilities in the VRM vulnerability database. The preliminary list is fed to an expert system, which applies specific rule sets using an inference engine and a knowledge base to refine results stored in the VRM vulnerability database by removing extraneous information and false positives.

17 Claims, 19 Drawing Sheets

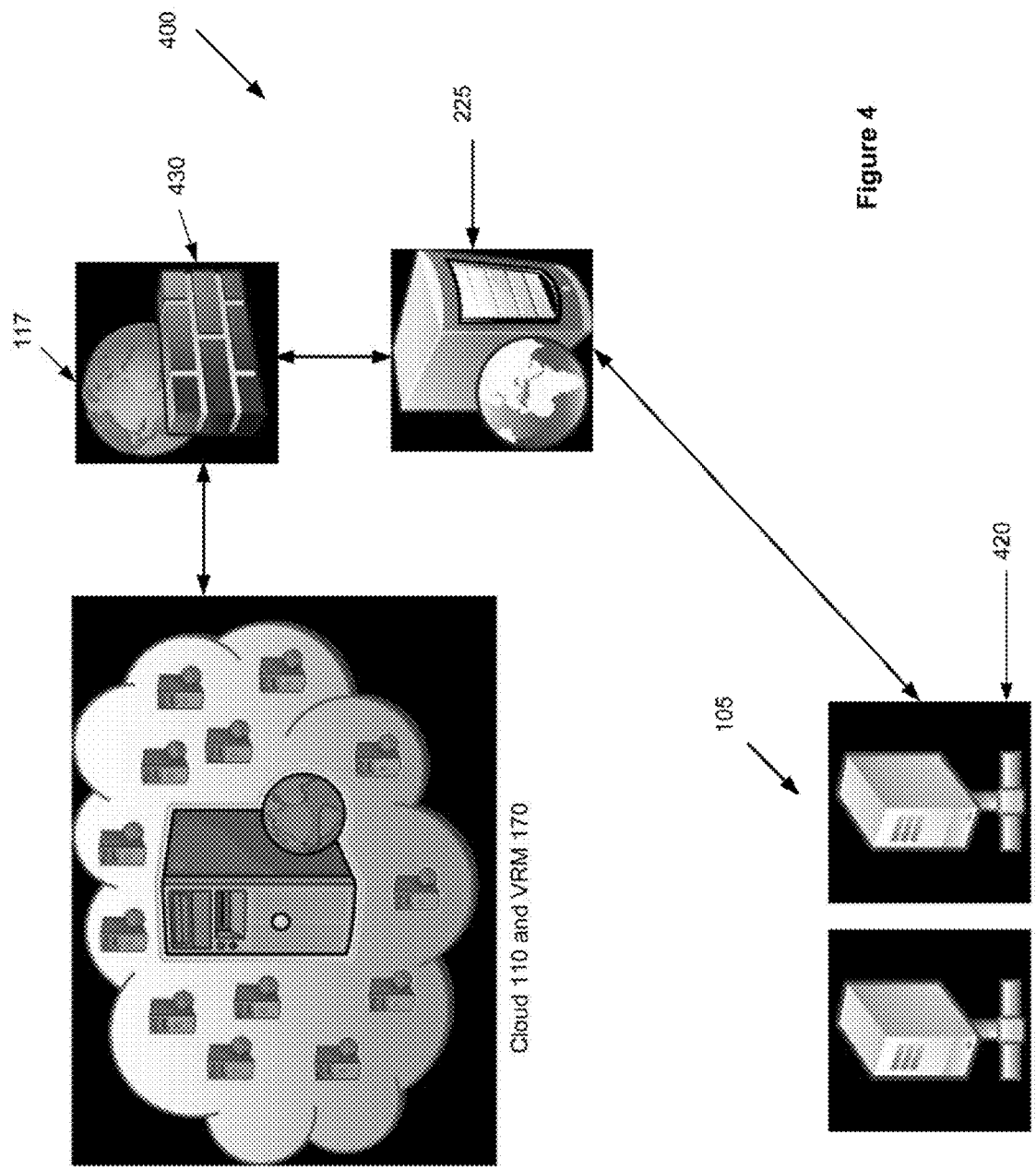

METHOD AND SYSTEM FOR MANAGING COMPUTER SYSTEM VULNERABILITIES

FIELD OF THE INVENTION

The present invention relates to software system security. More particularly, the present invention relates to a software-as-a-service cloud-based system and method for automating the life cycle of network auditing and vulnerability risk management for enterprise computer systems.

BACKGROUND OF THE INVENTION

In recent decades, enterprises and public institutions have been automating their operations by employing interne and/or network-enabled computer systems. As a result of the introduction of the World Wide Web in the mid-1990's, the majority of enterprises and public institutions host web sites for both internal and external use. Enterprises and public institutions have been facing the challenge of rendering their web sites and e-commerce sites more interactive and user friendly. These web sites need to be protected against a vast growing number of sophisticated attacks and malware injections in which "hackers" seek to "take over the machine."

Conventional IT security practice has shown that most organizations struggle in regularly testing and auditing systems for emerging IT security vulnerabilities. Such systems may provide only a list of problems that have been identified, and leave the organization with the task of sifting through a large amount of data in order to identify real issues.

Many organization employ conventional security vulnerability scanners to combat hacking and malware attacks. Unfortunately, conventional vulnerability scanners suffer from several imperfections. The potential vulnerabilities reported by conventional vulnerability scanners include a large number of false positives and conclusions rendered may be either incomprehensive, inaccurate, or both. Traditionally, to solve this problem, one or more human security experts have been employed to review and verify unverified vulnerabilities. However, the reviewing process may be laborious and may include abundant duplication of efforts. Further, disagreements among security experts frequently result based on individual skill sets, including knowledge of hacking techniques and other vulnerabilities. It also becomes necessary to periodically rehire consultants to re-test as networks and applications change. All of these factors increase total cost of ownership (TCO) of computer systems and web sites.

Accordingly, what would be desirable, but has not yet been provided, is an automated testing system and method that enables enterprises to effectively manage their vulnerabilities to eliminate false positives and maintain control over network security in a cost-effective, non-labor intensive manner.

SUMMARY OF THE INVENTION

The above-described problems are addressed and a technical solution is achieved in the art by providing a software-as-a-service cloud-based system and method for automating the life cycle of network auditing and vulnerability risk management for enterprise computer systems.

In one embodiment, a vulnerability risk management (VRM) module is instantiated in a cloud. The VRM module receives an indication of a VRM service to be provided from the end user. The VRM module extracts from the indication either external IP addresses or the web application URL, customer contact information, and a list of assets of the enterprise computer system to be tested.

In one embodiment, the assets are stored in a VRM vulnerability database. The VRM module populates the assets to be discovered in an asset interactive map located in the VRM vulnerability database. The VRM module discovers the assets of the enterprise computer system and receives positive or negative responses. The VRM module transmits the discovered assets to an interactive map located on a web page of the web site of the end user. The VRM module receives from the web site of the end user a request for a vulnerability scan using a predefined scan configuration based on preferences of the end user and a specified date and time to conduct the scan. The VRM module reports and stores a preliminary list of potential vulnerabilities in the VRM vulnerability database.

In one embodiment, the preliminary list is fed to an expert system. The expert system applies specific rule sets based on the type of assessment performed. The expert system employs an inference engine and a knowledge base to refine results stored in the VRM vulnerability database by removing extraneous information and false positives. The expert system presents refined results to a display which a penetration testing team may optionally verify on a sample basis.

In one embodiment, the VRM module may receive from the penetration testing team custom-created comments to complement vulnerability default descriptions. The VRM module transmits refined vulnerability results to the web site of the end user. The VRM module may open trouble tickets automatically based on a certain vulnerability thresholds predetermined by the end user and entered in the backend. Optionally, the VRM module may interpret and remove the refined vulnerabilities. The VRM module generates trouble tickets statistics that are automatically updated in a summary view, in a tickets view, and in a reports view.

In one embodiment, above-described problems are addressed and a technical solution is achieved in the art by providing a method and system for vulnerability risk management of an enterprise computer system. A cloud computing system instantiates a vulnerability risk management module and an expert system coupled to the vulnerability risk management module. The vulnerability risk management module is configured to receive from an end user a type of vulnerability, determine a list of potential vulnerabilities of the enterprise computer system based the received type of vulnerability, transmit the list of potential vulnerabilities to the expert system, receive from the expert system a refined list of potential vulnerabilities, and report a refined set of vulnerabilities to the end user. The refined set is substantially free of at least one of extraneous information or false positives.

In an embodiment, the refined set of vulnerabilities is based on an application of a rule set to the list of potential vulnerabilities by an inference engine and a knowledge base of the expert system. The inference engine is configured to iteratively refine the list of potential vulnerabilities using the knowledge base to produce the refined list of vulnerabilities. The rule set is based on the received type of vulnerability.

In an embodiment, the cloud employs a software-as-a-service multi-tenant architecture. The software-as-a-service multi-tenant architecture includes a dual factor log-in to prevent sharing of a database between the enterprise computing system and another enterprise computer system.

In an embodiment, determining the list of potential vulnerabilities comprises performing a scan of an asset of the enterprise computing system associated with the type of vulnerability. The asset may be at least one of an external network, an internal network, a Web application, a mobile application, a social engineering application, a voice-over Internet protocol (VoIP) application, or a wireless application. The scan is based on a non-intrusive scanning technique. The scan is based on a preference of the end user and a specified date and time to conduct the scan.

In an embodiment, the vulnerability risk management module may be configured to automatically open a trouble ticket based on a vulnerability threshold determined by the end user. The vulnerability risk management module may be configured to remove the refined set of vulnerabilities.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 4 illustrates one embodiment of a configuration of an internal network module operating in conjunction with an enterprise computing system;

FIGS. 7A and 7B are screen shots of an executive summary, technical details, and a full report, respectively;

FIG. 12 is a screen shot of an external VRM module predefined scan configuration based on preferences of an end user;

Figure 1:
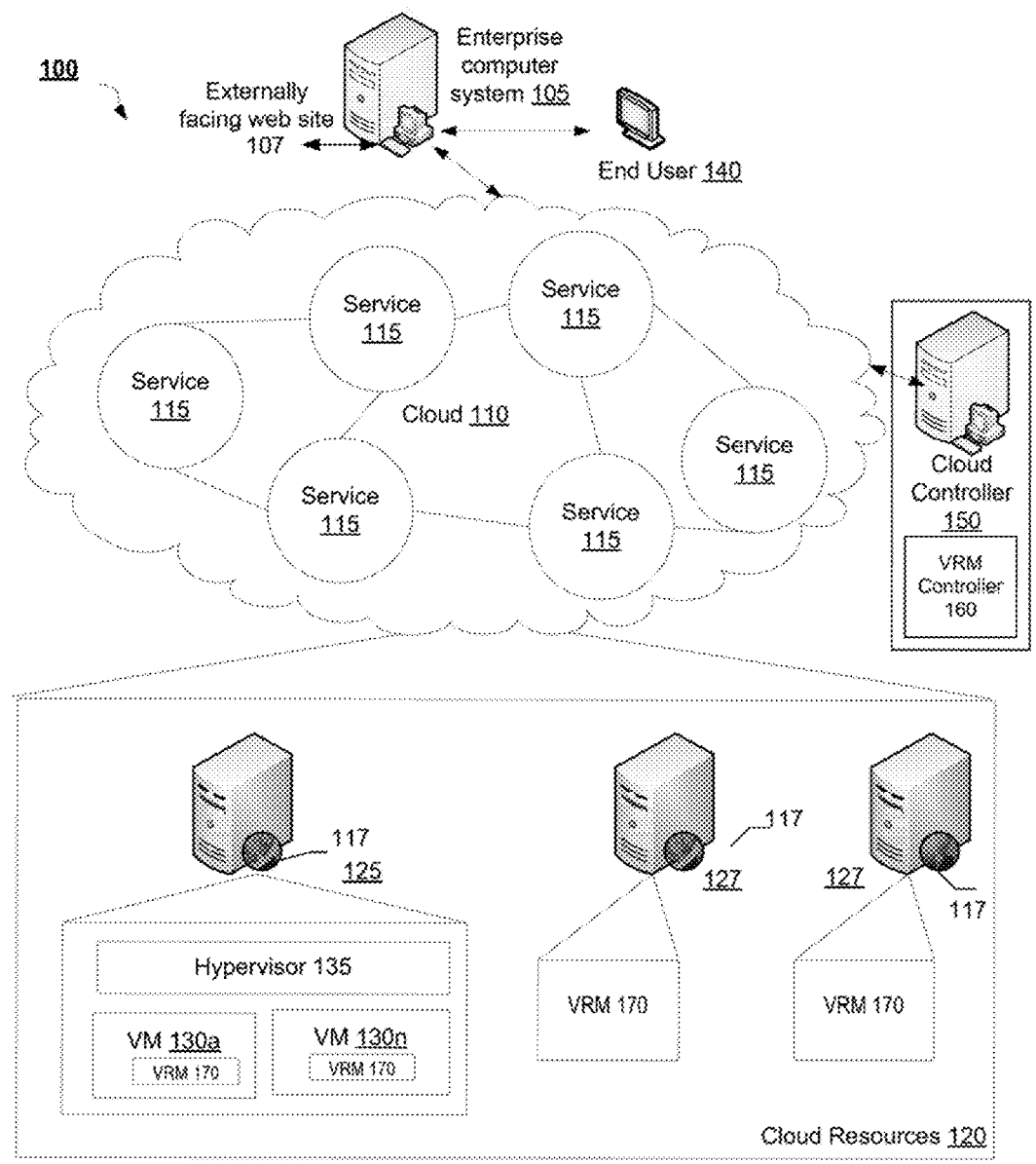
FIG. 1 illustrates an exemplary distributed management environment in which embodiments of the present invention may operate.

It is to be understood that the attached drawings are for purposes of illustrating the concepts of the invention and may not be to scale.

DETAILED DESCRIPTION OF THE INVENTION

The present invention relates to a method and cloud-based system that employs an expert system to automate the life cycle of network auditing and vulnerability risk management for enterprise software systems.

As used herein, the term "program", "application", "software package" or "computer executable instructions" refers to instructions that may be performed by a processor and/or other suitable components. The term "computer" or "server", as used herein, is not limited to any one particular type of hardware device, but may be any data processing device such as a desktop computer, a laptop computer, a kiosk terminal, a personal digital assistant (PDA) or any equivalents or combinations thereof. Any device or part of a device configured to process, manage or transmit data, whether implemented with electrical, magnetic, optical, biological components or otherwise, may be made suitable for implementing the invention described herein.

As used herein, the term communicatively connected is intended to include any type of connection, whether wired or wireless, in which data may be communicated. Furthermore, the term "communicatively connected" is intended to include a connection between devices and/or programs within a single computer or between devices and/or programs on separate computers.

Although specific embodiments have been illustrated and described herein, those of ordinary skill in the art will appreciate that an arrangement configured to achieve the same results may be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used.

As used herein, the terms "cloud" or "cloud computing" are the provisioning of dynamically scalable and often virtualized resources as a service over the Internet on a utility basis. Users need not have any knowledge of, expertise in, or control over the technology infrastructure in the "cloud" that supports them. Cloud computing services often provide common business applications online that are accessed from a web browser, while the software and data are stored on servers.

Cloud computing customers do not generally own the physical infrastructure serving as host to the software platform in question. They typically consume resources as a service and pay only for resources that they use. The majority of cloud computing infrastructures typically include services delivered through data centers and built on servers with different levels of virtualization technologies. The services are accessible from various locations that provide access to networking infrastructure. Clouds often appear as single points of access for all consumers' computing needs.

Cloud computing is quickly becoming the platform of choice for businesses that want to reduce operating expenses and be able to scale resources rapidly. Eased automation, flexibility, mobility, resiliency, and redundancy are several other advantages of moving resources to the cloud. On-premise private clouds permit businesses to take advantage of cloud technologies while remaining on a private network. Public clouds permit businesses to make use of resources provided by third party vendors. Hybrid clouds permit the best of both public and private cloud computing models. Many organizations are being introduced to cloud computing by employing the services of an off-premise third party cloud based on a Software-as-a-Service (SaaS) architecture. As used herein, Software-as-a-Service is a software delivery model in which software and associated data are centrally hosted on the cloud. SaaS is typically accessed by end users using a thin client via a web browser. One of the biggest selling points for an enterprise to employ an SaaS cloud for vulnerability management and remediation is the potential to reduce IT support costs by outsourcing hardware and software maintenance and support to the SaaS provider.

Embodiments of the present invention employ an SaaS solution that is based on a multi-tenant architecture. With this model, a single version of the application, with a single configuration (hardware, network, operating system), is used for all customers ("tenants"). To support scalability, the application is installed on multiple machines (called horizontal scaling).

The single tenant architectural configuration to be described below may employ one or more physical host machines or virtual machines (VMs) in the cloud (hereinafter referred to as "nodes"). For VMs, each VM may function as a self-contained platform, running its own operating system (OS) and software applications (processes). Typically, a virtual machine monitor (VMM) manages allocation and virtualization of computer resources and performs context switching, as may be necessary, to cycle between various VMs. Virtualization systems provide a potential means to access computing resources in a confidential and anonymous way.

FIG. 1 illustrates an exemplary distributed management environment 100 in which embodiments of the present invention may operate. The distributed management environment 100 may be, but is not limited to, a cloud 110 comprising dynamically scalable and virtualized resources used to provide services 115 over the Internet 117 to assess vulnerabilities of an enterprise computer system 105 and/or an externally-facing web site 107 associated with an end user 140. The cloud 110 may be an external public cloud. The cloud 110 may be part of an enterprise cloud computing solution produced by NopSec of Brooklyn, N.Y.

One or more end users 140 may access and utilize the services 115 via client programs without having to maintain dedicated hardware on their end. In one embodiment, a cloud controller 150 is provided to manage the resources and services of the cloud 110. More particularly, the cloud controller 150 is configured to implement a vulnerability risk management (VRM) controller 160 for instantiating, starting, executing, and coordinating, on a per enterprise/end user/customer basis (i.e., the enterprise computer system 105 associated with an end user 140 to be monitored for vulnerabilities), a corresponding vulnerability risk management (VRM) module 170 on an individual physical machine 127 or a virtual machine (VM) (e.g., 130a) to automate the life cycle of the corresponding enterprise computing system 105. In some embodiments, a host controller 125 may reside on a designated computer system (e.g., a server computer, a desktop computer, etc.) or be part of a host machine 125 or another machine. More particularly, one end user 140 is apportioned a single logical instance of cloud resources (i.e., a single instance of a cloud) that is logically separate from that of another end user 140 (i.e., no data or database resources or virtual machines are shared between end users 140).

As illustrated, a break-out box of the cloud 110 shows the actual cloud resources 120 including hardware that may be employed by embodiments of the invention as computing resources of the cloud 110. In one embodiment, one or more host machines 125 may be utilized to execute a plurality of virtual machines (VMs) 130a-130n (i.e., the nodes 130a-130n) that may be used as cloud computing resources. In embodiments of the invention, each host machine 125 is capable of running one or more virtual machines (VMs) 130a-130n. Each of the VMs 130a-130n runs a guest operating system (OS) that may be different from one another. Each of the VMs 130a-130n is configured to execute an instance of a VRM module 170. The guest OS may include Microsoft Windows, Linux, Solaris, etc. The host machine 125 may include a hypervisor 135 that emulates the underlying hardware platform for the VMs 130a-130n. The hypervisor 135 may also be known as a virtual machine monitor (VMM), a kernel-based hypervisor, or a host operating system. In one embodiment, each of the VM 130a-130n may be accessed by one or more of enterprise computer systems 105 associated with end users 140 over a network 117. The network 117 may be a private network (e.g., a local area network (LAN), wide area network (WAN), intranet, etc.) or a public network (e.g., the Internet). In another embodiment, a physical machine 127 (i.e., the nodes 127) may be utilized directly as cloud computing resources to execute an instance of a VRM module 170.

Figure 2:
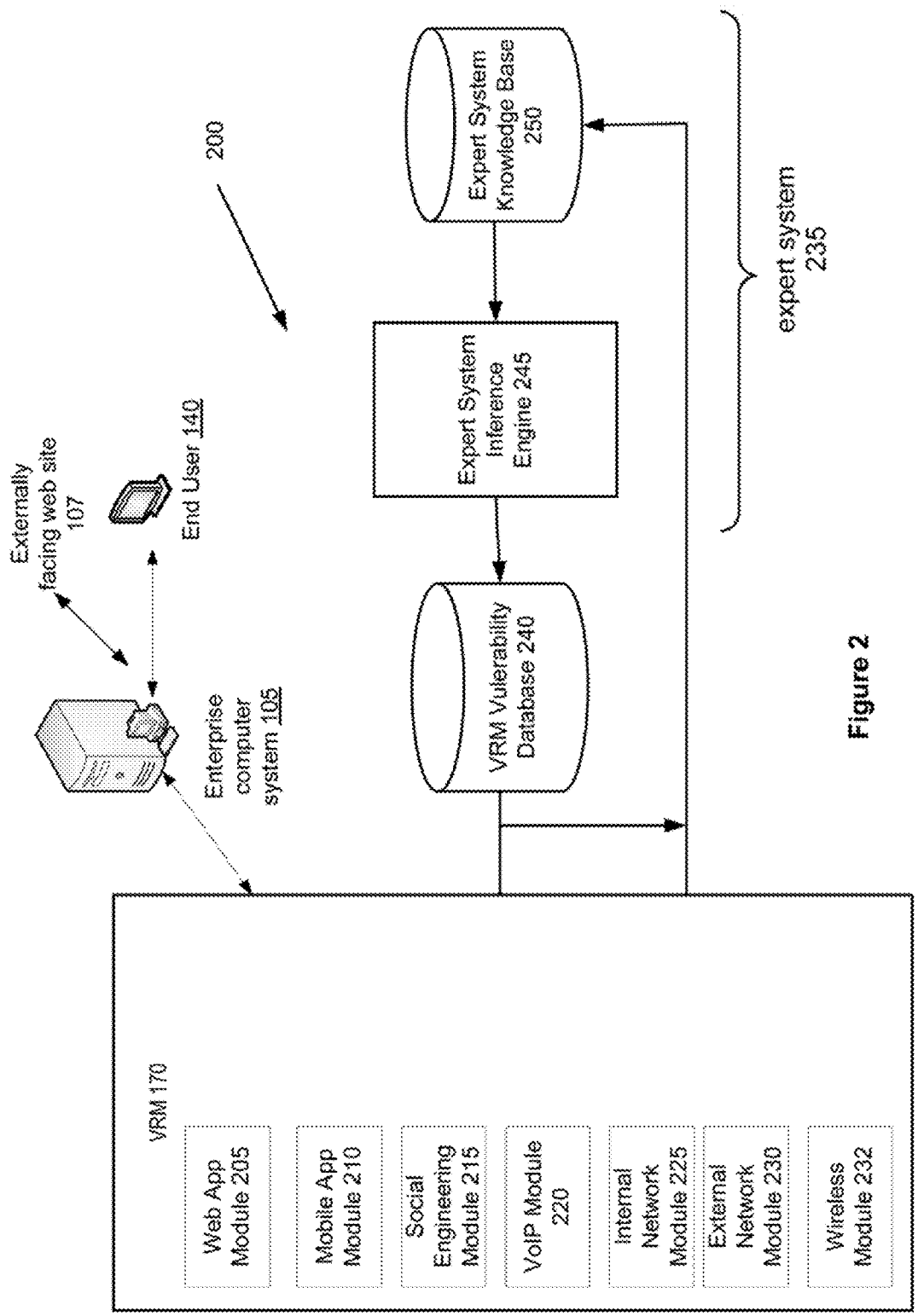
FIG. 2 illustrates an architecture of one embodiment of one instance of a vulnerability risk management module (VRM) configured to operate in conjunction with an artificial intelligence (AI) expert engine for detecting and assessing vulnerabilities of enterprise computer systems associated with an end user.

FIG. 2 illustrates an architecture 200 of one embodiment of one instance of vulnerability risk management module (VRM) 170 configured to operate in conjunction with an artificial intelligence (AI) expert engine 245 for detecting and assessing vulnerabilities of enterprise computer systems 105 associated with end users 140. The computing architecture 200 includes the cloud 110 (not shown). The VRM 170 may include one or more modules 205-232 for performing vulnerability checks on a vulnerability type basis. Such modules may include a Web application module 205, a mobile application module 210, a social engineering module 215, a voice-over Internet protocol (VoIP) module 220, an internal network module 225, an external network module 230, and a wireless module 232.

Figure 3:
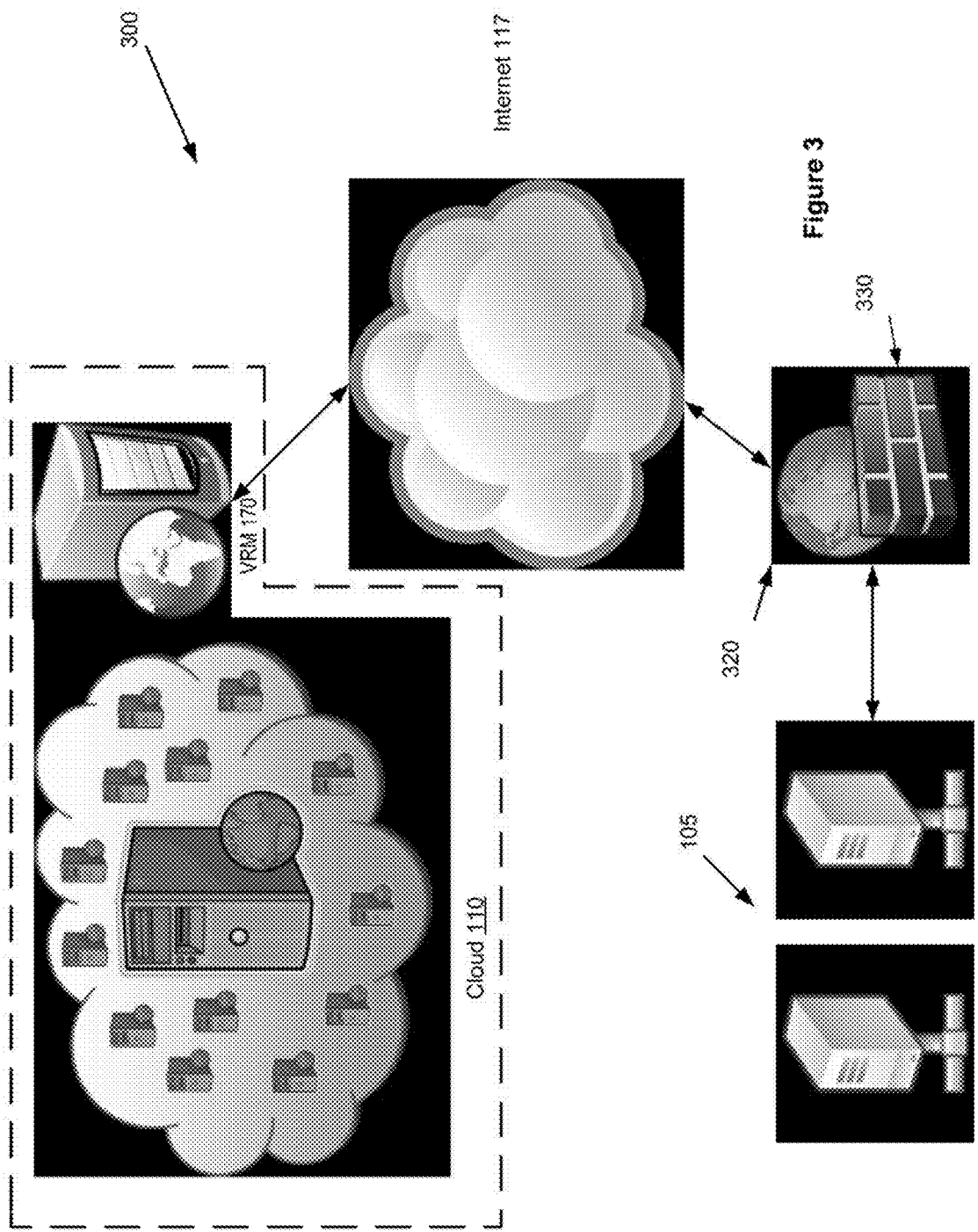
FIG. 3 illustrates one embodiment of a configuration of an external network module operating in conjunction with an enterprise computing system.

FIG. 3 illustrates one embodiment of a configuration 300 of the external network module 230 operating in conjunction with an enterprise computing system 105. The external network module 230, as part of an instance of a VRM 170 in the cloud 110, may operate via the Internet 117 to access an external network 320 in front of a firewall 330 associated with the enterprise computing system 105. The external network module 230 is configured to perform unauthenticated and authenticated external network scans and provide a report of threats to the external network 320 associated with the client enterprise computing system 105. The scans employ non-intrusive scanning techniques, i.e., there is minimal impact on network resources when a scan is in progress. Scans may be scheduled (i.e., unauthenticated checks, e.g., whether there is a file present, whether through banner grabbing there is a specific service present, whether there is a match of a certain version of an operating system, etc., and authenticated checks where a login is performed to permit examination of, e.g., the file system, registry, whether patches have been applied, etc.). The external network module 230 is secured by a dual factor log-in provided on an independent cloud based server in the cloud 110 so that there is no shared database between one enterprise computing system and another.

Figure 5A:
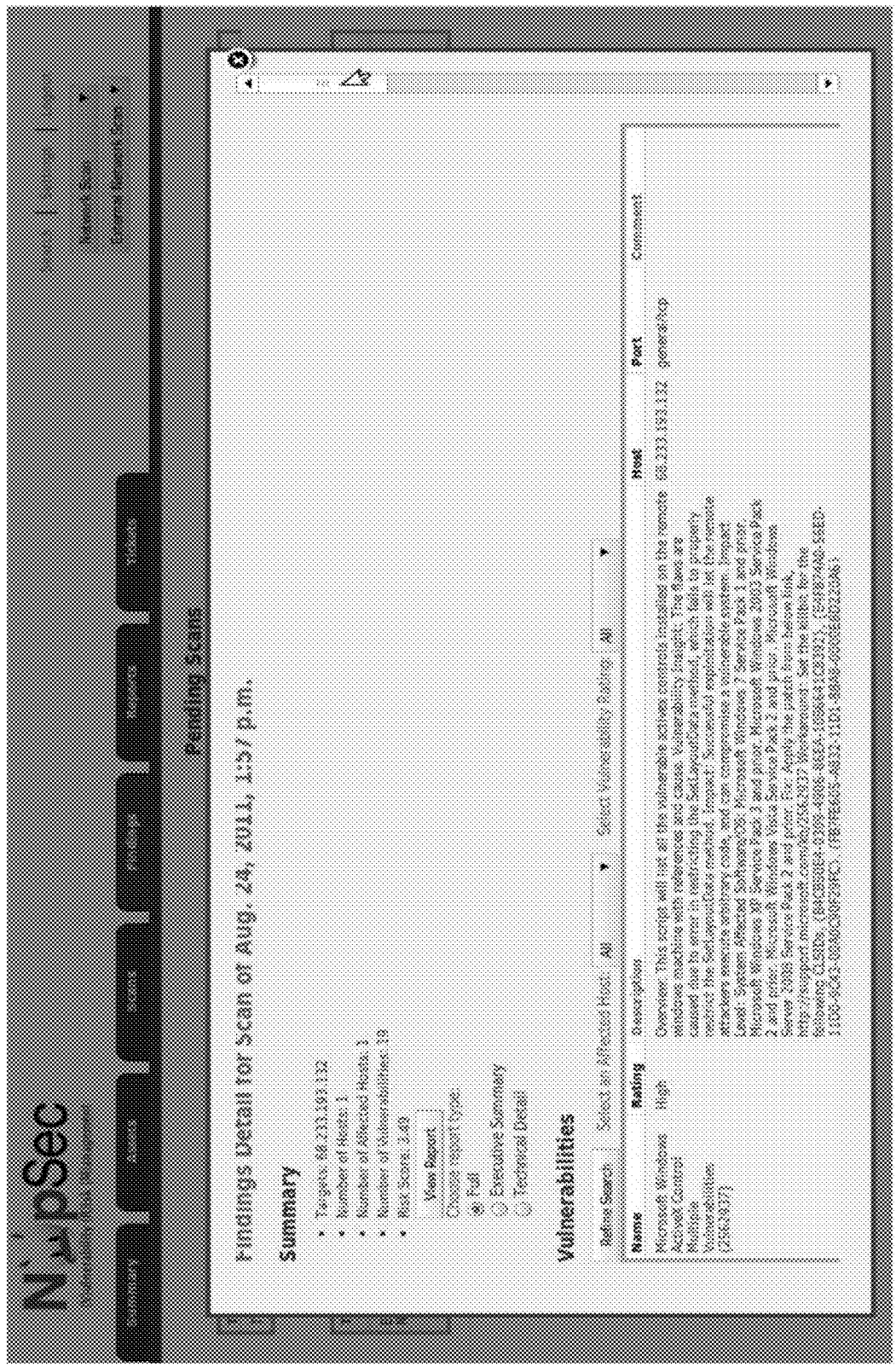
FIGS. 5A and 5B are example screen shots of reports of vulnerabilities presented in detailed or executive summary form on a remote web-based dashboard, respectively.
Figure 5B:
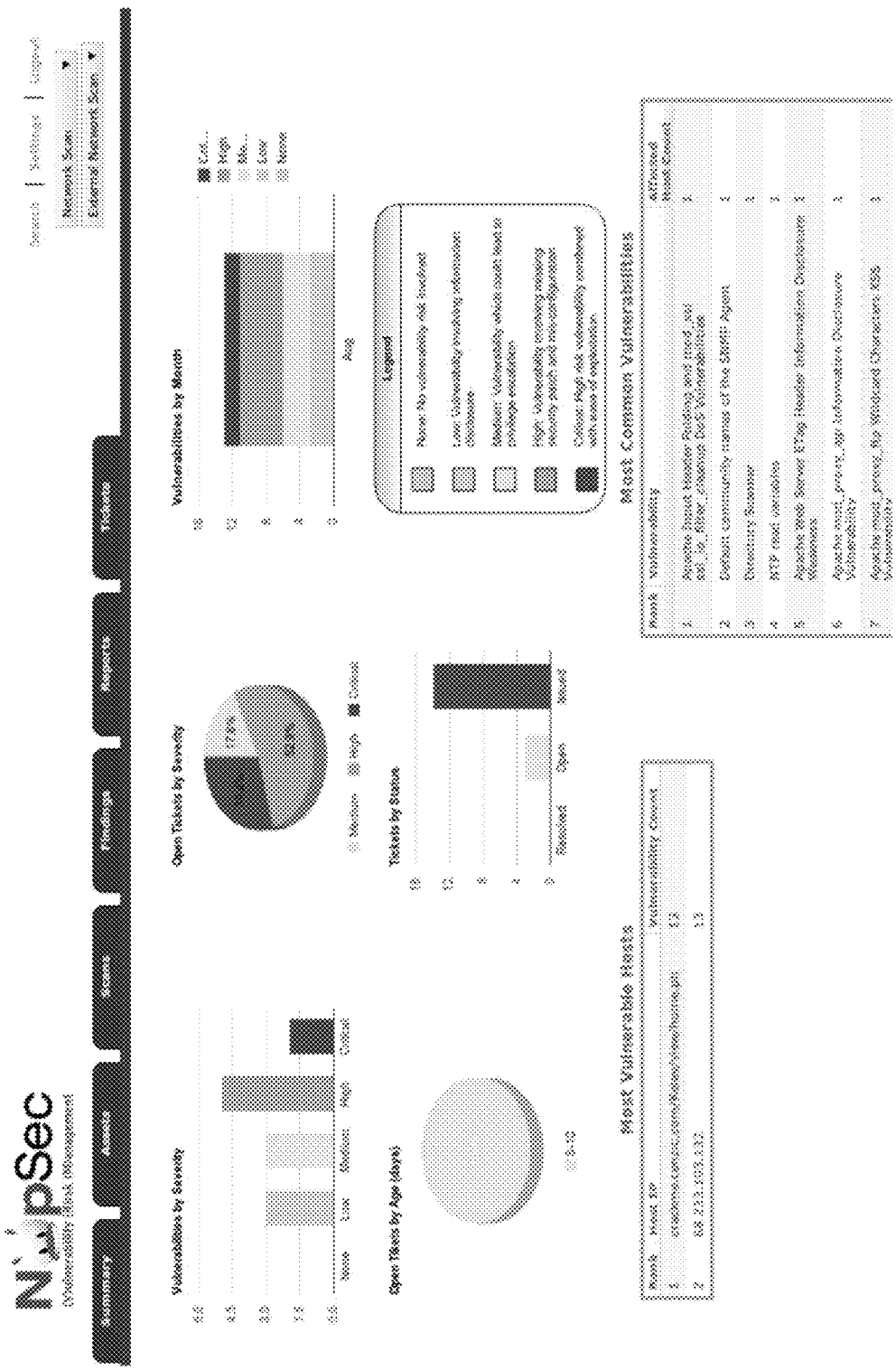

In an embodiment, the external network module 230 is configured to automate the life cycle of network auditing and vulnerability management across the enterprise computing system 105, including network discovery and mapping, asset prioritization, vulnerability assessment reporting and charting, and remediation tracking and ticketing system according to business risk. Reports of vulnerabilities may be presented in detailed or executive summary form on a remote web-based dashboard (see FIGS. 5A and 5B, respectively).

FIG. 4 illustrates one embodiment of a configuration 400 of the internal network module 225 operating in conjunction with an enterprise computing system 105. The internal network module 225, although associated with an instance of a VRM 170 in the cloud 110, also referred to as a VRM Appliance 225, is a server distinct from the cloud 110 and configured to access and test an internal network 420 located behind a firewall 430 of the enterprise computing system 105. The internal network module 225 is configured to perform internal asset management, internal network authenticated and unauthenticated scanning, and monitor critical OS and application directories for changes and responses of the internal network 420 of the enterprise computing system 105. The internal scans are configurable for customized audits, permitting global scans, or scan of specific parts of the internal network 420 on additional infrastructure. The internal network module 225 is secured by a dual factor log-in provided on an independent cloud based server in the cloud 110 so that there is no shared database between one enterprise computing system and another.

In an embodiment, the internal network module 225 is configured to automate the life cycle of internal network auditing and vulnerability management across the enterprise computing system 105, including network discovery and mapping, asset prioritization, vulnerability assessment reporting and charting, and remediation tracking and ticketing system according to business risk. Reports of vulnerabilities may be presented in detailed or executive summary form on a remote web-based dashboard (see FIGS. 5A and 5B, respectively).

Returning to FIG. 2, the VRM 170 further includes the Web application module 205 available to enterprise computing systems 105 having an Internet-facing website that need help to protect against threats such as SQL and other malware injections, and to help to meet the requirements of regulations for card payments such as PCI compliance.

The Web application module 205 is further configured to locate security vulnerabilities that are included in the Open Web Application Security Project (OWASP) Top 10 and the Web Application Security Consortium (WASC) Threat Classification taxonomies. The Web application module 205 trains itself by learning from HTTP responses it receives during an audit process of the Internet-facing website of the enterprise computing systems 105. The Web application module 205 accounts for the dynamic nature of web applications and can detect changes caused while traveling through the paths of a web application's cyclomatic complexity. As a result, attack/input vectors are detected that would otherwise be undetectable by non-humans. The Web application module 205 may employ a browser Java applet Web spider to manually browse the Internet-facing website of the enterprise computing systems 105, so that the Web spider can reach links and forms that are not reachable by an automatic scanner.

The Web application module 205 can detect credit card information and mask the data it captures. The Web application module 205 provides access to all inbound and outbound data with no latency. The Web application module 205 is secured by a dual factor log-in provided on an independent cloud based server in the cloud 110 so that there is no shared database between one enterprise computing system and another. The Web application module 205 employs an asynchronous HTTP model to improve performance. The Web application module 205 module further offers:

TABLE 1

Figure 6A:
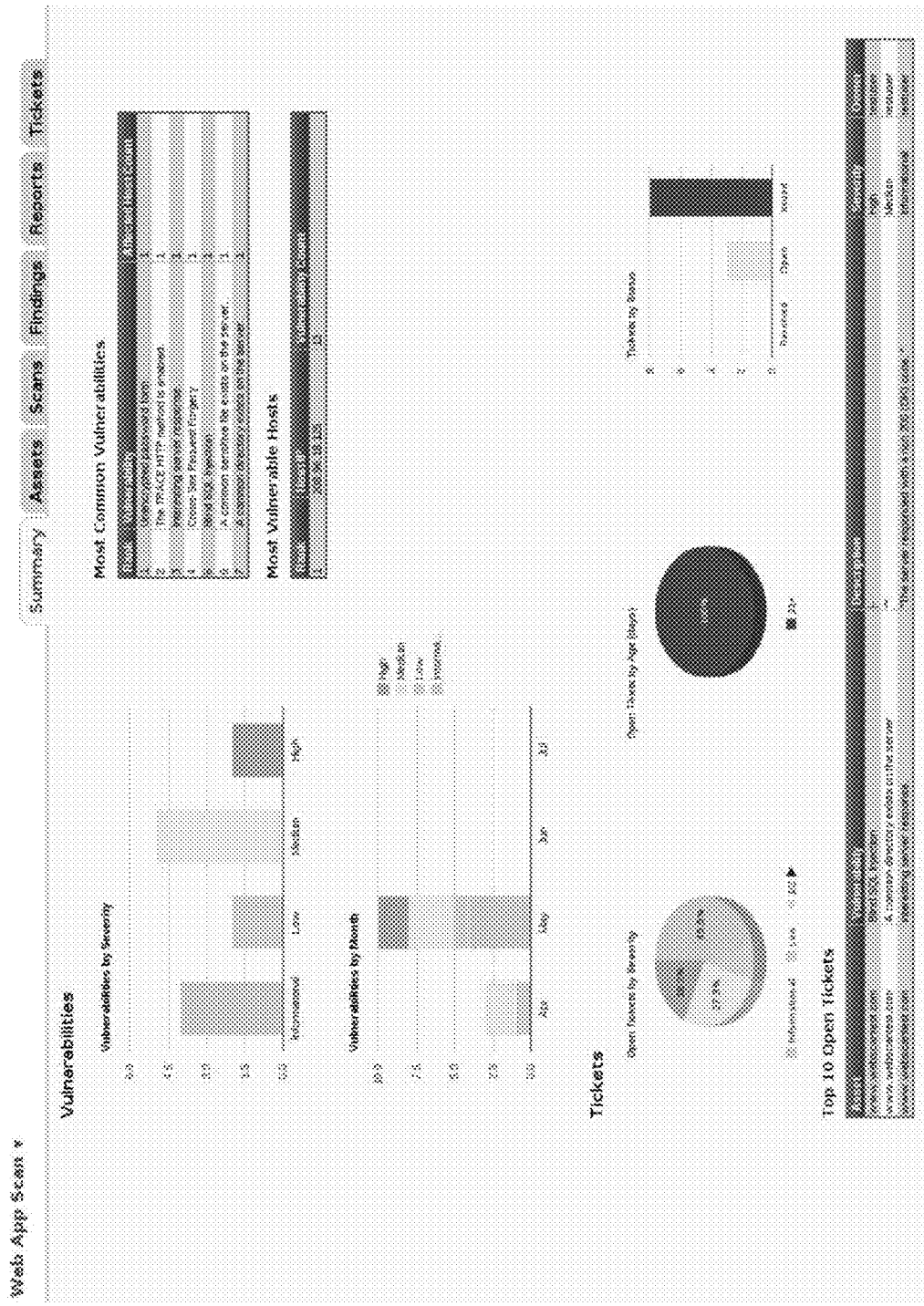
FIG. 6A is a screen shot of an interactive chart dashboard.
Figure 6B:
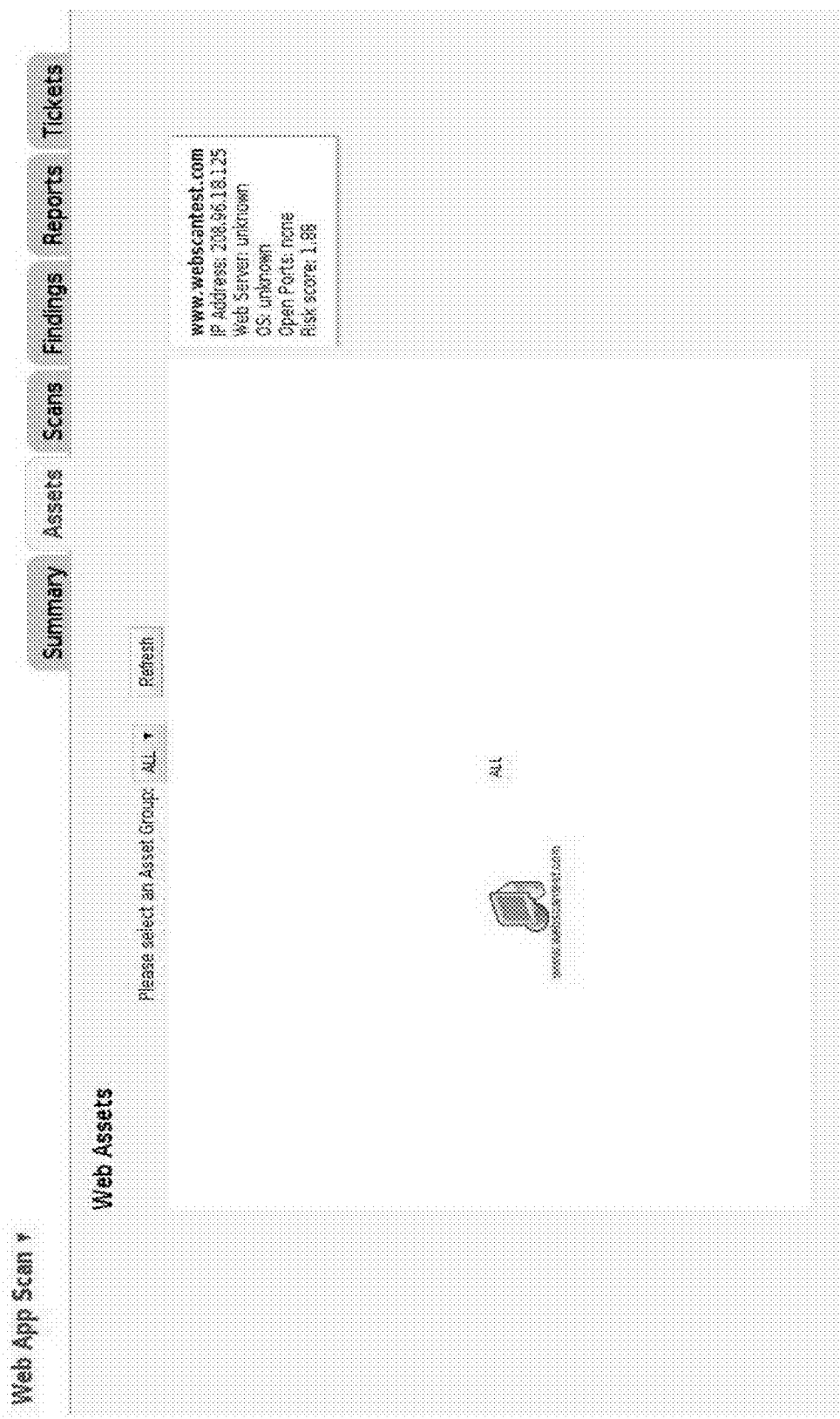
FIG. 6B is a screen shot of an interactive asset map for web applications and web server fingerprinting.
Figure 7A:
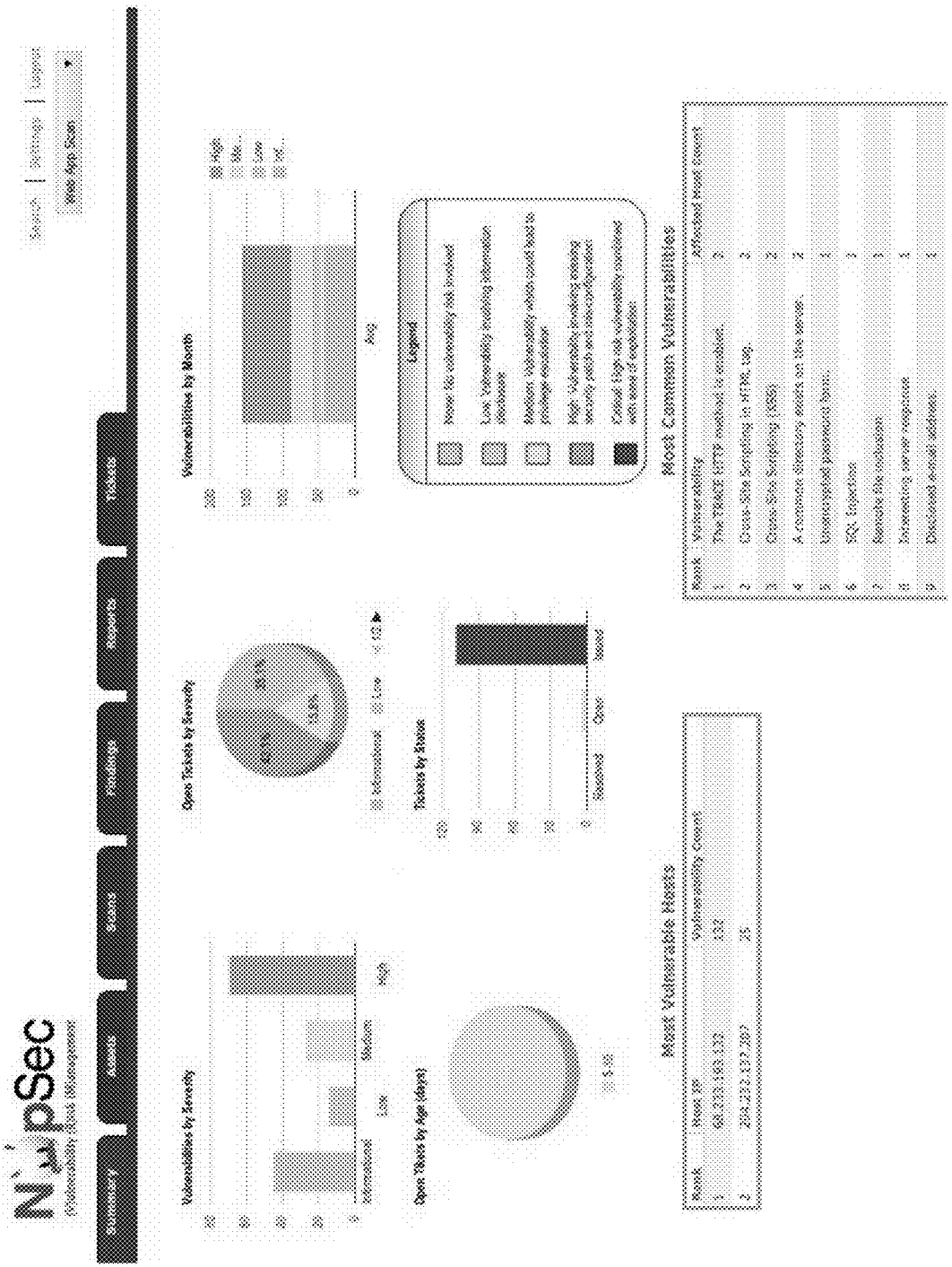
Figure 7B:
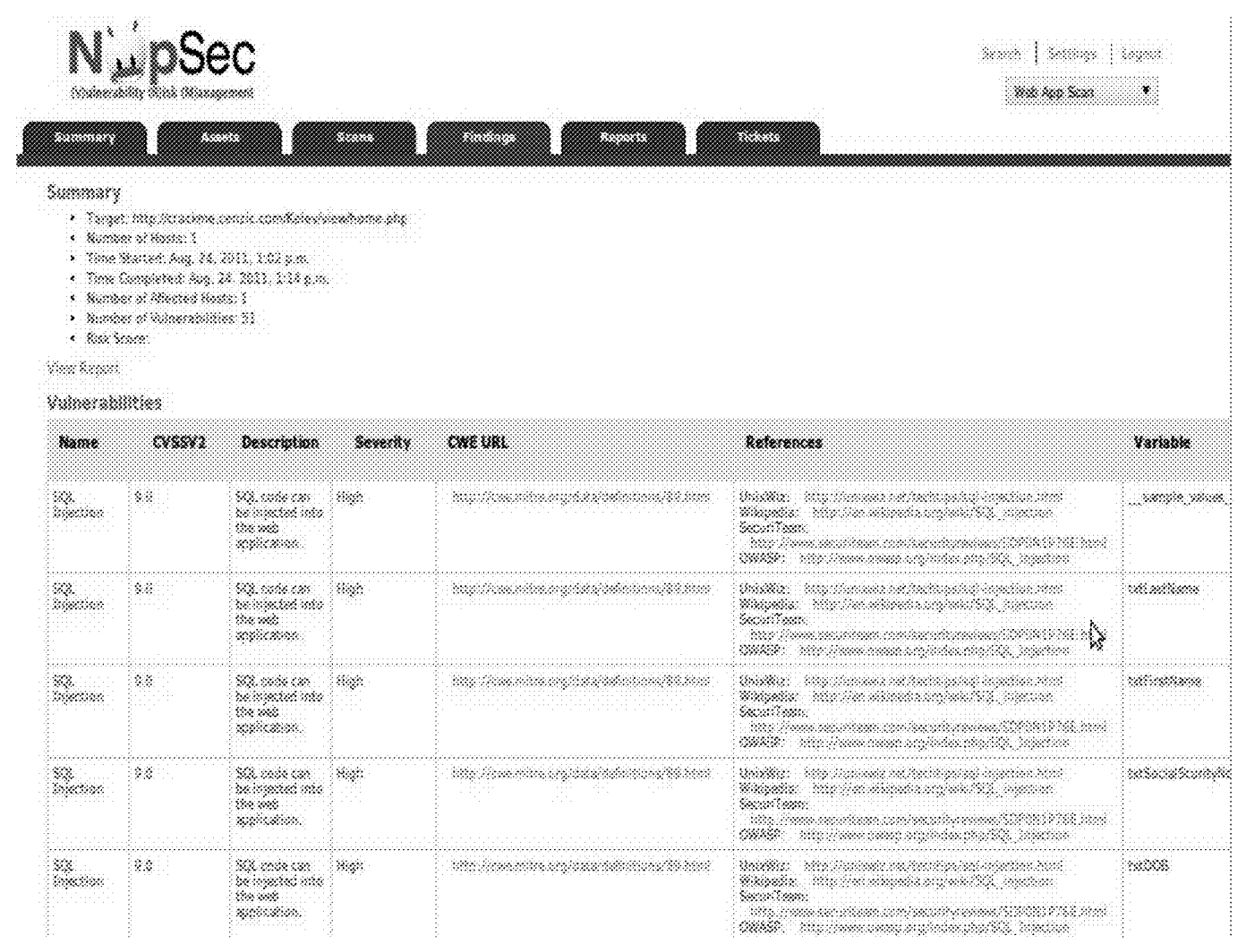

An interactive Chart Dashboard (see FIG. 6A)
An interactive asset map for web application and web server fingerprinting (see FIG. 6B)
An on-demand scan feature including date, time, credentials, scan template, differential scan andmanual scan with Java applet browser
Vulnerability Re-testing functionality
Visual rendering of the affected and vulnerable web applications pages
VRM signature "false-positive" elimination workflow interacting with the NopSec Penetration Testing Team in the back-end
HTML and PDF reports including Executive Summary, Technical Details and Full Report (see FIGS. 7A and 7B)
An interactive Trouble Ticketing System to escalate and resolve the web application security vulnerabilities identified The Web application module 205 supports scan templates. Scan templates are created by a penetration testing team to provide custom tailored audits to cover specific web application vulnerabilities (e.g., SQL injection, Cross-Site Scripting (XSS), Directory Transversal, Cross-Site Request Forgery, etc.).

Returning to FIG. 2, the VRM 170 further includes a mobile application module 210 The mobile application module 210 is configured to install agents on the Apple iOS, the Android, and the Blackberry operating system, inventory the mobile systems, monitor those systems for the presence of malicious applications, and monitor device actions that may indicate that a malicious application is installed or that the user is leaking corporate confidential documents. All this may be controlled from a central web-based cloud dashboard (not shown).

The VRM 170 further includes a social engineering module 215. The social engineering module 215 permits an organization to send phishing email on-demand to attempt to induce users to click on email links that may cause their desktops to be high-jacked. The process is managed through an easy-to-use management web-based dashboard (not shown).

The VRM 170 further includes a VoIP module 220. The VoIP module 220 helps find vulnerabilities in the VoIP infrastructure (e.g., including telephones and gateways). Scanning engines of the VoIP module 220 are located both outside and inside an organization's firewall. The scanning engines of the VoIP module 220 identify vulnerabilities in telephones and VoIP network infrastructure related to confidentiality, integrity and availability. The assessment process is managed through an easy-to-use management web-based dashboard (not shown).

The VRM 170 further includes a wireless module 232. The wireless module 232 permits organizations to detect vulnerabilities which may have been enabled by mis-configurations of wireless access points and controllers as well as the wrong logical positioning of a wireless network within an enterprise computing system. By employing a wireless module 232, the enterprise computing system may: (1) perform wireless site surveys of system wireless network signals and other neighboring wireless access points; (2) perform rogue access point detection via wireless and wired network scans; (3) performing WEP, WPA, and WPA2 wireless network encryption key cracking via dictionary and brute force using cloud computing resources; and (4) obtain executive summary and/or technical reports of periodic wireless network security assessments.

As true of all VRM modules, the modules 210, 215, 220, 232 are secured by a dual factor log-in provided on an independent cloud based server in the cloud 110 so that there is no shared database between one enterprise computing system and another.

Returning to FIG. 2, the raw vulnerability data collected by the modules 205-232 are stored in a VRM vulnerability database 240. The data stored in the VRM vulnerability database 240 is further processed to assess whether any of the detected vulnerabilities may be false positives, useless information, and whether the vulnerabilities have been assigned the correct risk value. False positives are removed and vulnerabilities further assessed by an artificial intelligence (AI) expert system 235. More particularly, the expert system 235 includes an inference engine 245 configured for automatically reviewing, verifying, and discovering potential security vulnerabilities of an enterprise computing systems 105 and a human designed and refined knowledge base 250.

An expert system is a computer system that emulates the decision-making ability of a human expert. It is designed to solve complex problems by "reasoning" about knowledge, similar to a human expert, instead of by following procedural algorithms as is the case in conventional programming. An expert system has two parts, one fixed, independent of the expert system: the inference engine 245, and one variable: the knowledge base 250. To run an expert system, the inference engine 245 reasons about the knowledge base 250. The expert system 235 may be implemented using, for example, the public domain package CLIPS (The name is an acronym for "C Language Integrated Production System") to implement the inference engine 245. The CLIPS inference engine may be written, for example, in the Python programming language. PyClips may be employed as the interface between Python programming language and the CLIPS environment. The overall expert system 235 may be a Django Application under Django web framework.

Figure 8A:
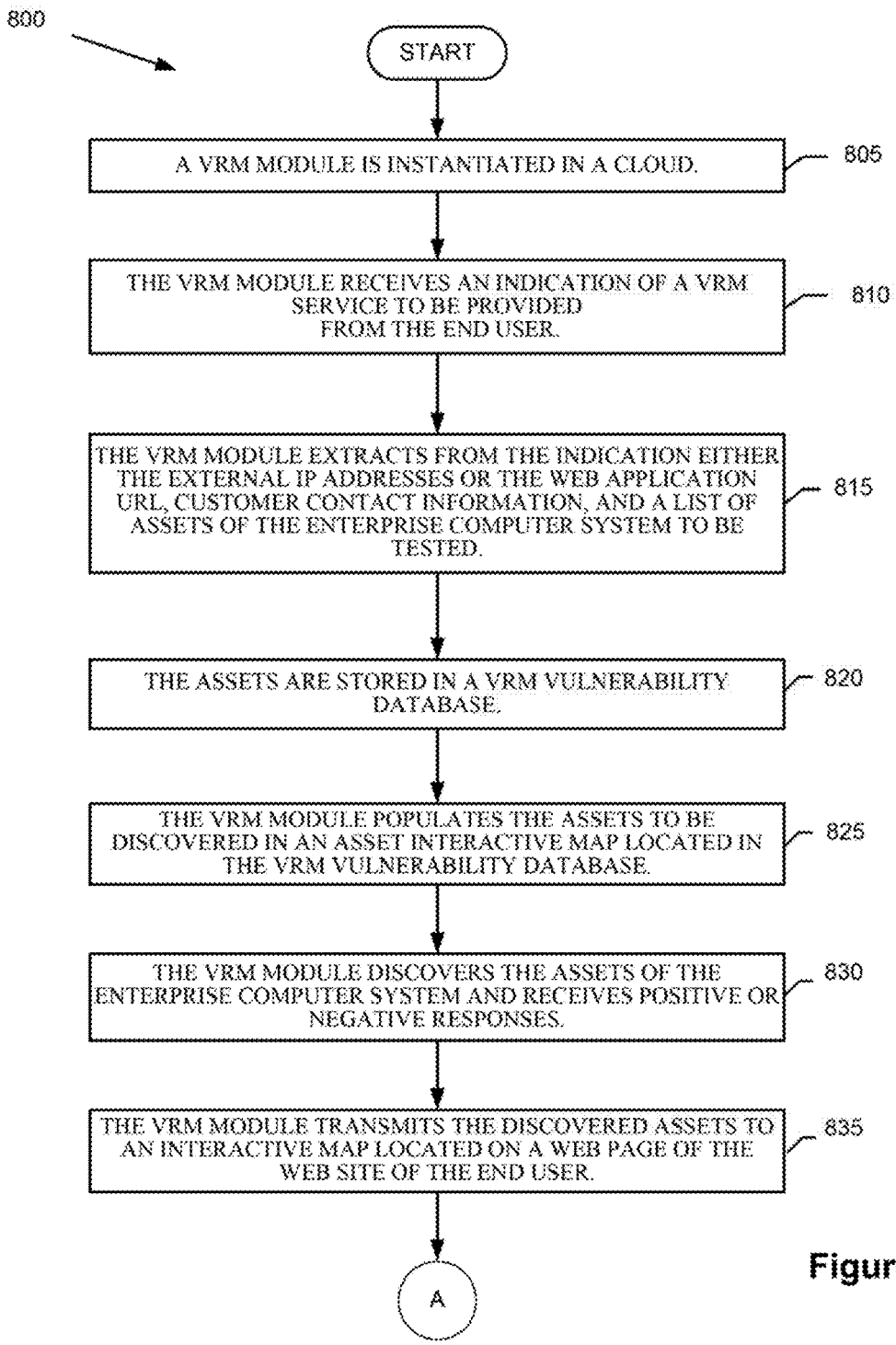
FIGS. 8A-8C are a flow diagram illustrating one embodiment of a method for automating vulnerability risk management of an enterprise computer system associated with an end user.
Figure 8B:
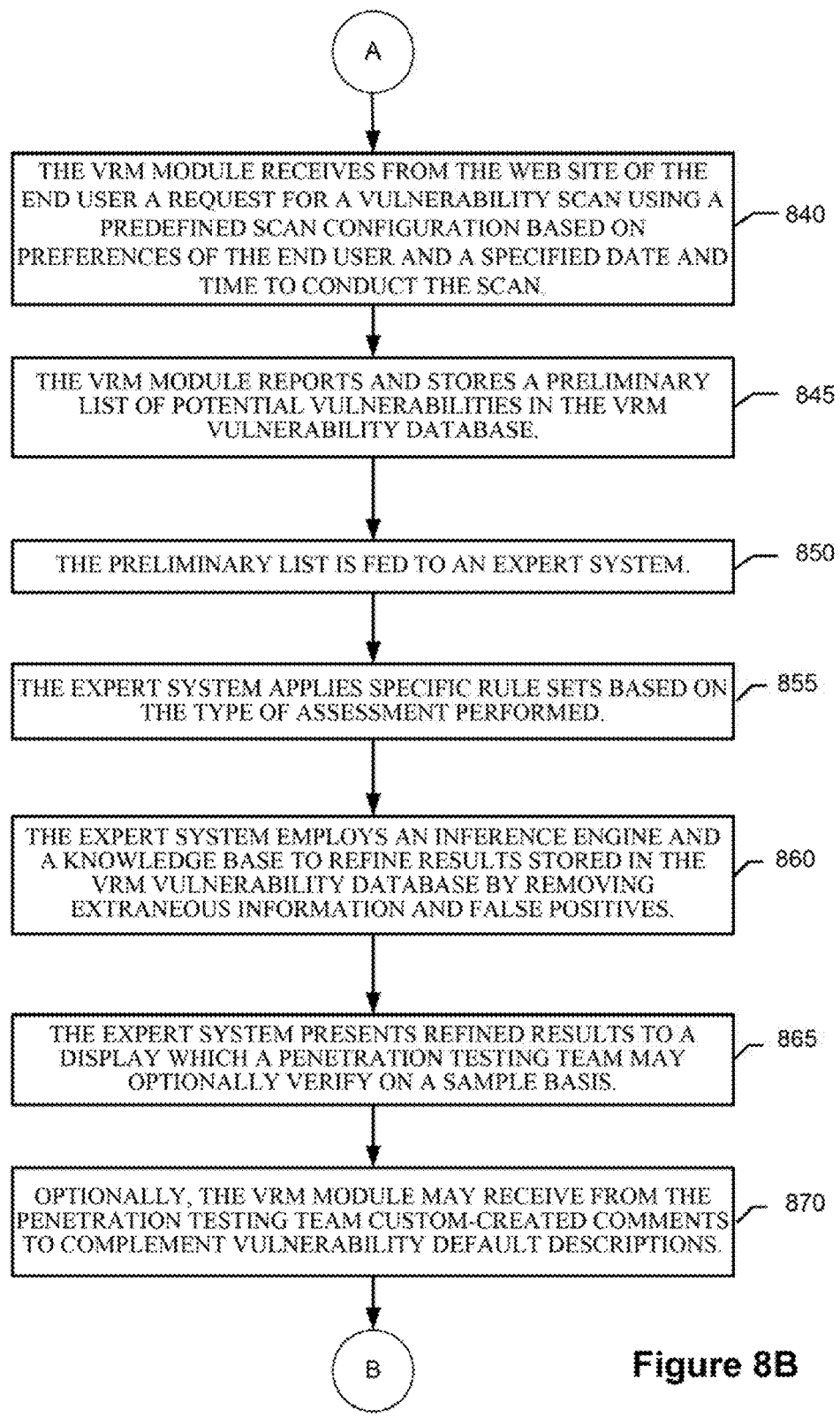
Figure 8C:
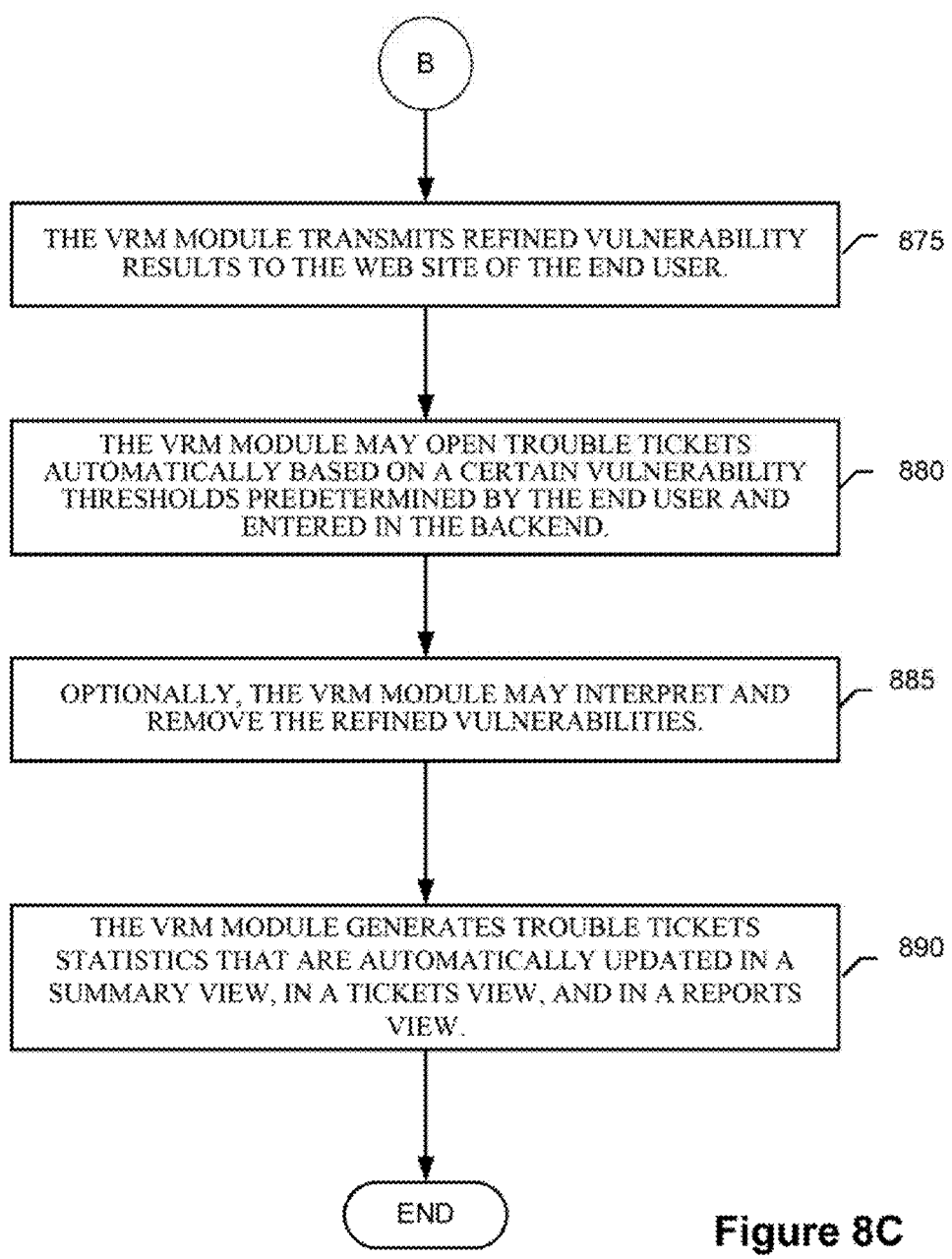
Figure 11:
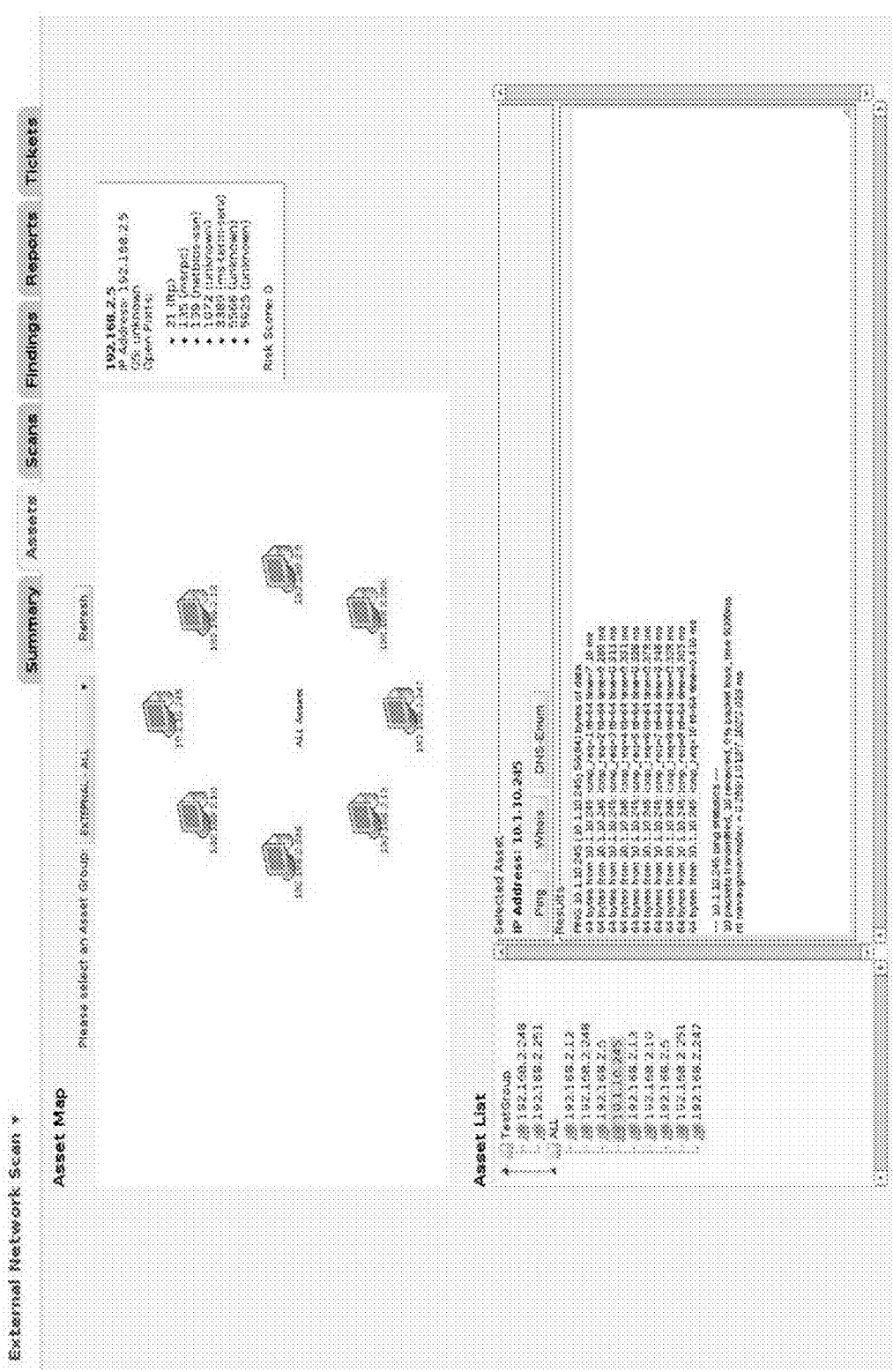
FIG. 11 is a screen shot of an external VRM module asset interactive map.

FIGS. 8A-8C are a flow diagram illustrating one embodiment of a method 800 for automating vulnerability risk management of an enterprise computer system 105 associated with an end user 140. At block 805, an instance of a VRM module 170 is instantiated in the cloud 110. At block 810, the VRM module 170 receives over the Internet 117 from an externally facing web site 107, an indication from the end user 140 of an associated enterprise computer system 105 a VRM service to be provided—external, internal, web application, wireless, PCI or exploitation, or a combination of any of these. At block 815, the VRM module 170 extracts from the previously received indication either the external IP addresses or the web application URL of the enterprise computer system 105 of an end user 140, customer contact information, and a list of assets of the enterprise computer system 105. The assets may include, for example, operating systems, services and open ports associated with the enterprise computer system 105. At block 820, the assets are stored in the VRM vulnerability database 240 of FIG. 2. The assets may also be grouped in an asset group based on preferences of the end user 140. At block 825, the VRM module 170 populates the assets to be discovered in an asset interactive map located in the VRM vulnerability database 240 (See FIG. 11).

Figure 9:
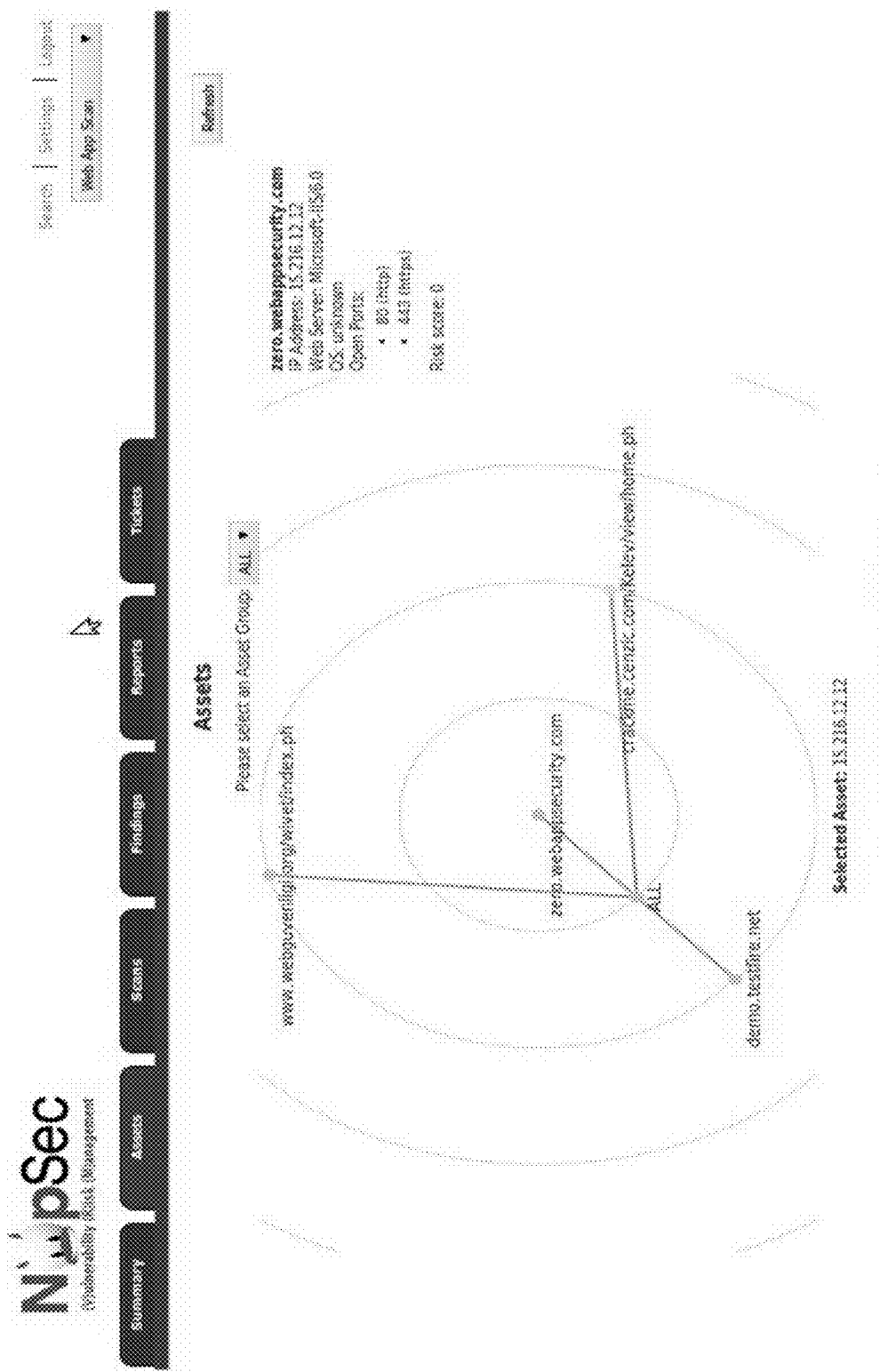
FIG. 9 is a screen shot of a listing of discovered assets presented on an interactive map located on a web page of the Web site of the end user.
Figure 12:
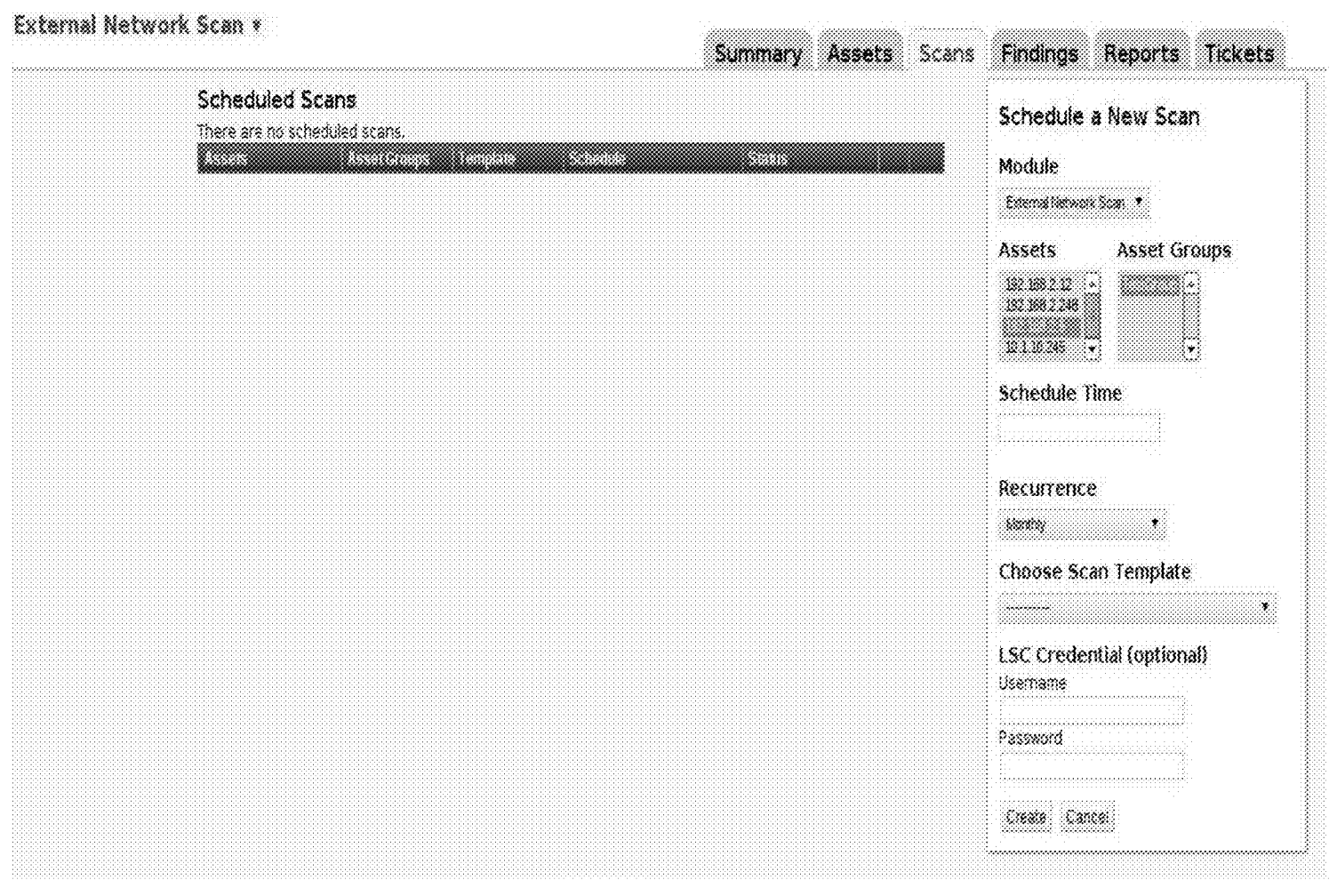

At block 830, the VRM module 170 discovers the assets of the enterprise computer system 105 and receives positive or negative responses. At block 835, the VRM module 170 transmits the discovered assets to an interactive map (see FIG. 9) located on a web page of the Web site 107 of the end user 140. At block 840, the VRM module 170 receives from the Web site 107 of the end user 140 a request for a vulnerability scan using a predefined scan configuration based on preferences of the end user 140 (See FIG. 12) and a specified date and time to conduct the scan.

At block 845, the VRM module 170 reports and stores a preliminary list of potential vulnerabilities in the VRM vulnerability database 240. At block 850, the preliminary list is fed to the expert system 235, which, at block 855, applies specific rule sets based on the type of assessment performed (external, internal, wireless, web application, etc.). The expert system 235 is part of the instance of the VRM instantiated in the cloud 110 and refines raw results to keep manual verification to a minimum. At block 860, the expert system 235 employs the inference engine 245 and the knowledge base 250 to refine results stored in the VRM vulnerability database 240 by removing extraneous information and false positives. At block 865, the expert system 235 presents refined results to a display (not shown) which a penetration testing team may optionally verify on a sample basis. Optionally, at block 870, the VRM module 170 may receive from the penetration testing team custom-created comments to complement vulnerability default descriptions. At block 875, the VRM module 170 transmits refined vulnerability results to the Web site 107 of the end user 140. The end user 140 may view and print the reports in HTML and PDF.

Figure 13:
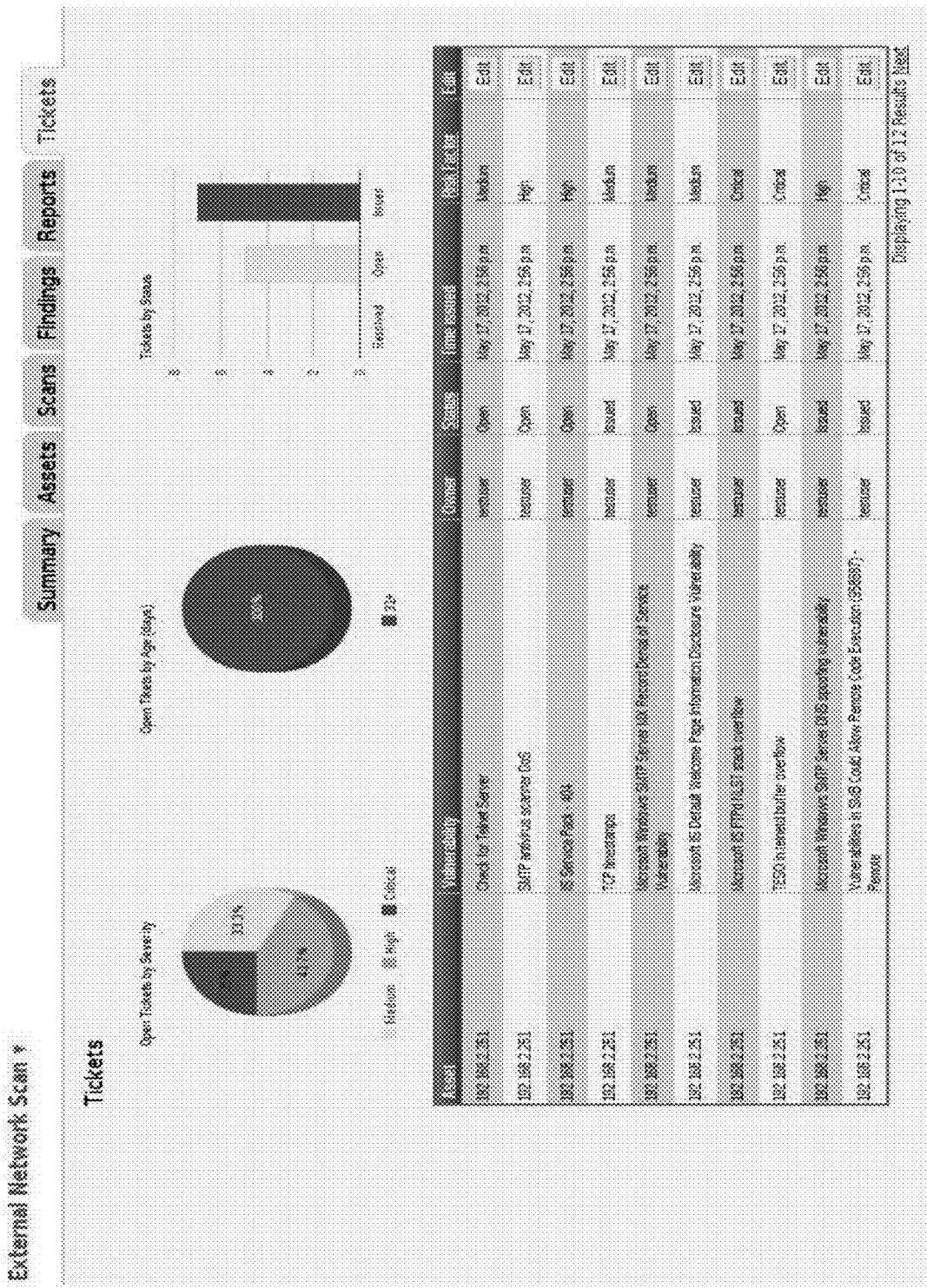
FIG. 13 is a screen shot of an external VRM module list of trouble tickets automatically based on a certain vulnerability thresholds predetermined by the end user.
Figure 14:
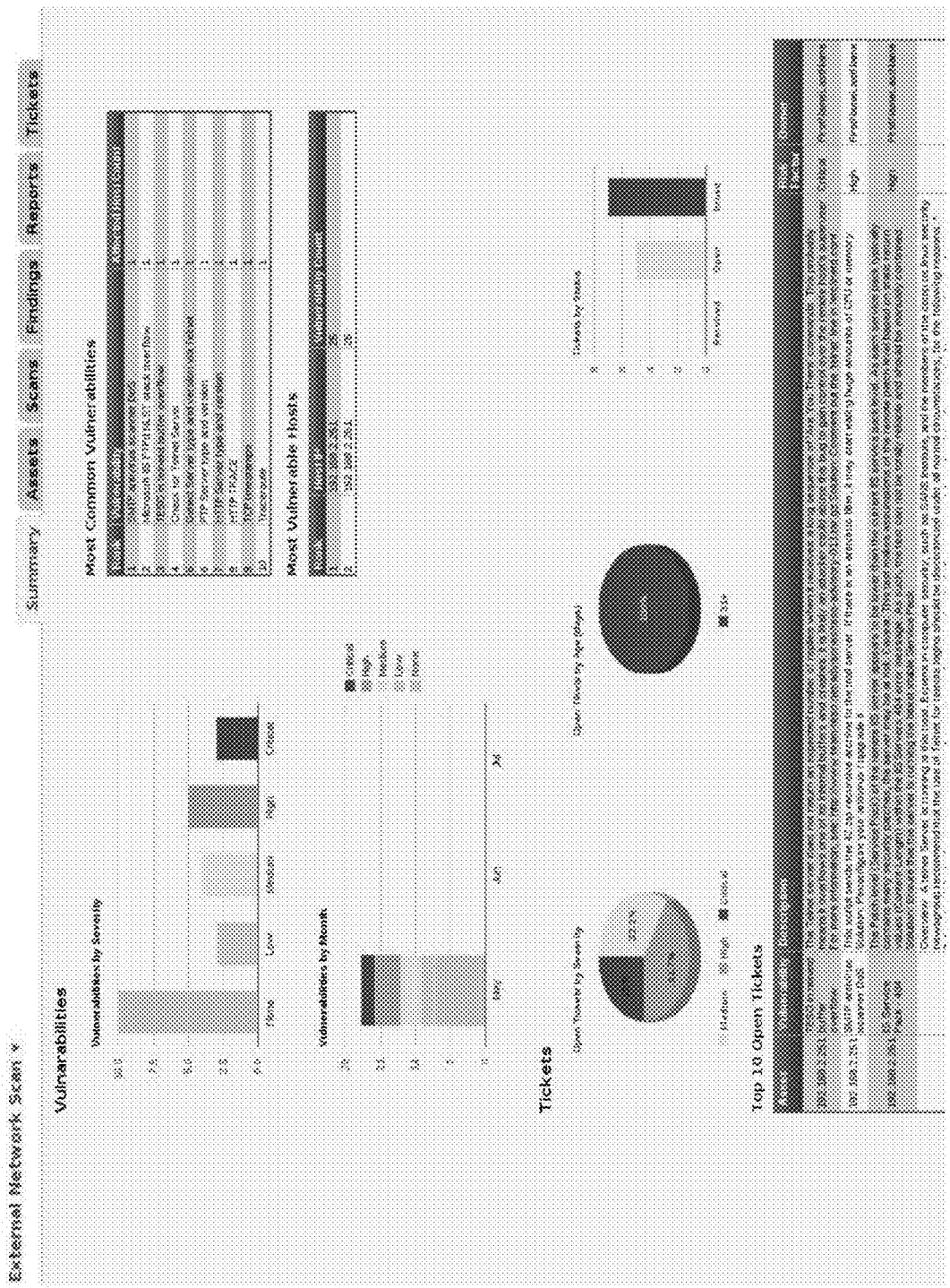
FIG. 14 is a screen shot of an external VRM module report view.

At block 880, the VRM module 170 may open trouble tickets automatically based on certain vulnerability thresholds predetermined by the end user 140 and entered in the backend. (See FIG. 13). At optional block 885, the VRM module 170 may interpret and remove the refined vulnerabilities (i.e., primarily by the expert engine (about 80%) and then for quality assurance by human experts (about 20%)). The end user 140 can ask questions about the vulnerabilities in the ticketing system and the penetration testing team may reply to them with answers (i.e., by system engineers via an interactive chat session) until the trouble ticket is closed. Trouble tickets may be escalated (i.e., by the end user 140, e.g., a transfer of ownership from the user to a system administrator). At block 890, the VRM module 170 generates trouble tickets statistics that are automatically updated in a summary view, in a tickets view, and in a reports view (See FIG. 14).

Figure 10:
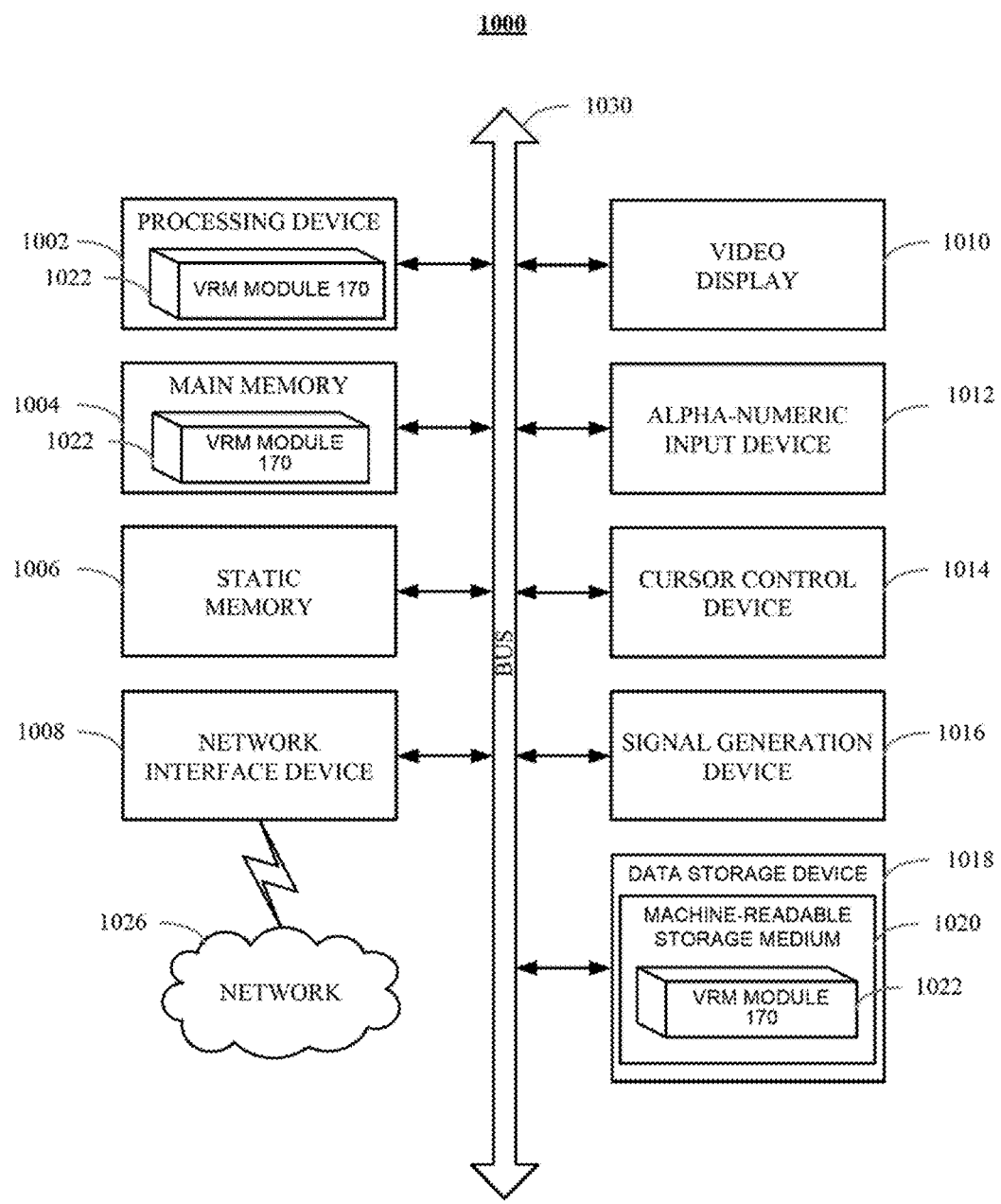
FIG. 10 illustrates a diagrammatic representation of a machine in the exemplary form of a computer system within which a set of instructions, for causing the machine to perform any one or more of the methodologies discussed herein, may be executed.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute device queue manager logic 1022 for performing the operations and steps discussed herein.

Computer system 1000 may further include a network interface device 1008. Computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

Data storage device 1018 may include a machine-readable storage medium (or more specifically a non-transitory computer-readable storage medium) 1020 having one or more sets of instructions (e.g., the VRM module 170) embodying any one or more of the methodologies of functions described herein. The VRM module 170 may also reside, completely or at least partially, within main memory 1004 and/or within processing device 1002 during execution thereof by computer system 1000; main memory 1004 and processing device 1002 also constituting machine-readable storage media. Content processing logic 1022 may further be transmitted or received over a network 1026 via network interface device 1008.

Machine-readable storage medium 1020 may also be used to store the device queue manager logic persistently. While machine-readable storage medium 1020 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein may be implemented as discrete hardware components or integrated in the functionality of hardware components such as ASICs, FPGAs, DSPs or similar devices. In addition, these components may be implemented as firmware or functional circuitry within hardware devices. Further, these components may be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for vulnerability risk management of an enterprise computing system, comprising the steps of:

instantiating, by a cloud computing system employing a software-as-a-service multi-tenant architecture, a vulnerability risk management module and an expert system coupled to the vulnerability risk management module, the vulnerability risk management module configured for:
  receiving from an end user a type of vulnerability;
  determining a list of potential vulnerabilities of the enterprise computing system based on a non-intrusive scan of the enterprise computing system for the received type of vulnerability, wherein the scan includes a scan of an asset of the enterprise computing system associated with the type of vulnerability and wherein the scan is based on a preference of the end user regarding a specified date and time to conduct the scan;
  transmitting the list of potential vulnerabilities to the expert system;
  receiving from the expert system a refined list of potential vulnerabilities; and
  reporting the refined list of vulnerabilities to the end user.

2. The method of claim 1, wherein the refined list is free of at least one of extraneous information and false positives.

3. The method of claim 1, wherein the refined list of vulnerabilities is based on an application of a rule set to the list of potential vulnerabilities by an inference engine and a knowledge base of the expert system.

4. The method of claim 3, wherein the rule set is based on the received type of vulnerability.

5. The method of claim 3, wherein the inference engine is configured to iteratively refine the list of potential vulnerabilities using the knowledge base to produce the refined list of vulnerabilities.

6. The method of claim 1, wherein the software-as-a-service multi-tenant architecture includes a dual factor log-in to prevent sharing of a database between the enterprise computing system and another enterprise computing system.

7. The method of claim 1, wherein the asset is at least one of an external network, an internal network, a Web application, a mobile application, a social engineering application, a voice-over Internet protocol (VoIP) application, or a wireless application.

8. The method of claim 1, further comprising automatically opening a trouble ticket based on a vulnerability threshold determined by the end user.

9. The method of claim 1, further comprising resolving at least one vulnerability on the refined list of vulnerabilities and removing the at least one vulnerability from the refined list of vulnerabilities.

10. A system for vulnerability risk management of an enterprise computing system, comprising:
  a cloud computing system employing a software-as-a-service multi-tenant architecture, having a hardware processor and a memory configured to instantiate a vulnerability risk management module and an expert system coupled to the vulnerability risk management module, the vulnerability risk management module configured to:
    receive from an end user a type of vulnerability;
    determine a list of potential vulnerabilities of the enterprise computing system based on a non-intrusive scan of the enterprise computing system for the received type of vulnerability, wherein the scan includes a scan of an asset of the enterprise computing system associated with the type of vulnerability, and wherein the scan is based on a preference of the end user regarding a specified date and time to conduct the scan;
    transmit the list of potential vulnerabilities to the expert system;
    receive from the expert system a refined list of potential vulnerabilities; and report the refined list of vulnerabilities to the end user.

11. The system of claim 10, wherein the refined list is free of at least one of extraneous information and false positives.

12. The system of claim 10, wherein the refined list of vulnerabilities is based on an application of a rule set to the list of potential vulnerabilities by an inference engine and a knowledge base of the expert system.

13. The system of claim 12, wherein the inference engine is configured to iteratively refine the list of potential vulnerabilities using the knowledge base to produce the refined list of vulnerabilities.

14. The system of claim 10, wherein the software-as-a-service multi-tenant architecture includes a dual factor log-in to prevent sharing of a database between the enterprise computing system and another computer computing system.

15. The system of claim 10, wherein the vulnerability risk management module is configured to automatically open a trouble ticket based on a vulnerability threshold determined by the end user.

16. The system of claim 10, wherein the vulnerability risk management module is configured to resolve at least one vulnerability from the refined list of vulnerabilities and remove the at least one vulnerability from the refined list of vulnerabilities.

17. A non-transitory computer-readable storage medium including instructions that, when accessed by a processing system, cause the processing system to perform a method for vulnerability risk management of an enterprise computing system employing a software-as-a-service multi-tenant architecture, comprising the steps of:
  instantiating, by a cloud computing system, a vulnerability risk management module and an expert system coupled vulnerability risk management module, the vulnerability risk management module configured for:
  receiving from an end user a type of vulnerability;
  determining a list of potential vulnerabilities of the enterprise computing system based on a non-intrusive scan of the enterprise computing system for the received type of vulnerability, wherein the scan includes a scan of an asset of the enterprise computing system associated with the type of vulnerability, and wherein the scan is based on a preference of the end user regarding a specified date and time to conduct the scan;
  transmitting the list of potential vulnerabilities to the expert system;
  receiving from the expert system a refined list of potential vulnerabilities; and
  reporting the refined list of vulnerabilities to the end user.

* * * * *